United States Patent
Xiao

(10) Patent No.: US 9,144,040 B2
(45) Date of Patent: Sep. 22, 2015

(54) SYSTEM AND METHOD FOR UPLINK MULTI-ANTENNA POWER CONTROL IN A COMMUNICATIONS SYSTEM

(75) Inventor: Weimin Xiao, Hoffman Estates, IL (US)

(73) Assignee: FutureWei Technologies, Inc., Plano, TX (US)

( * ) Notice: Subject to any disclaimer, the term of this patent is extended or adjusted under 35 U.S.C. 154(b) by 376 days.

(21) Appl. No.: 13/074,974

(22) Filed: Mar. 29, 2011

(65) Prior Publication Data

US 2011/0243007 A1 Oct. 6, 2011

Related U.S. Application Data

(60) Provisional application No. 61/320,058, filed on Apr. 1, 2010.

(51) Int. Cl.
| | |
|---|---|
| *H04B 7/185* | (2006.01) |
| *H04W 52/42* | (2009.01) |
| *H04B 7/04* | (2006.01) |
| *H01Q 1/24* | (2006.01) |
| *H01Q 21/28* | (2006.01) |
| *H04W 52/14* | (2009.01) |
| *H04W 88/02* | (2009.01) |
| *H04W 52/34* | (2009.01) |

(52) U.S. Cl.
CPC ............ *H04W 52/42* (2013.01); *H01Q 1/246* (2013.01); *H01Q 21/28* (2013.01); *H04B 7/0447* (2013.01); *H04W 52/146* (2013.01); *H04W 52/34* (2013.01); *H04W 88/02* (2013.01)

(58) Field of Classification Search
None
See application file for complete search history.

(56) References Cited

U.S. PATENT DOCUMENTS

| | | | |
|---|---|---|---|
| 2007/0195907 A1* | 8/2007 | Wang et al. | 375/267 |
| 2008/0081655 A1 | 4/2008 | Shin et al. | |
| 2010/0027696 A1* | 2/2010 | Lee et al. | 375/260 |
| 2010/0296591 A1* | 11/2010 | Xu et al. | 375/259 |
| 2011/0039589 A1 | 2/2011 | Skov | |
| 2011/0096815 A1* | 4/2011 | Shin et al. | 375/219 |
| 2011/0105173 A1* | 5/2011 | Haim et al. | 455/522 |
| 2011/0105174 A1* | 5/2011 | Pelletier et al. | 455/522 |
| 2011/0207415 A1* | 8/2011 | Luo et al. | 455/68 |
| 2011/0216724 A1* | 9/2011 | Zhao et al. | 370/329 |

FOREIGN PATENT DOCUMENTS

| | | |
|---|---|---|
| CN | 101674642 A | 3/2010 |
| JP | 2006503522 A | 1/2006 |
| JP | 2013509007 A | 3/2012 |
| WO | 2004036767 A2 | 4/2004 |

(Continued)

OTHER PUBLICATIONS

Motorola, "UL Power Control for Multi-Antenna UE," 3GPP TSG RAN1#60, R1-101115, Feb. 22-26, 2010, 7 pages, San Francisco, USA.

(Continued)

*Primary Examiner* — Anh-Vu Ly
(74) *Attorney, Agent, or Firm* — Slater & Matsil, L.L.P.

(57) ABSTRACT

A system and method for uplink multi-antenna power control in a communications system are provided. A method for user equipment operations includes determining a transmit power level for transmit antennas of the user equipment having at least two transmit antennas, and setting a power amplifier output level for each of the at least two transmit antennas in accordance with a respective transmit power level.

20 Claims, 9 Drawing Sheets

(56) References Cited

FOREIGN PATENT DOCUMENTS

| WO | 2006069321 A2 | 6/2006 |
|---|---|---|
| WO | WO 2009-133420 A1 | 11/2009 |
| WO | 2011040647 A1 | 4/2011 |

OTHER PUBLICATIONS

Samsung, "UL power headroom report and SU-MIMO power control," 3GPP TSG RAN WG1 Meeting #60, R1-101149, Feb. 22-26, 2010, 4 pages, San Francisco, USA.

"3rd Generation Partnership Project; Technical Specification Group Radio Access Network; Requirements for further advancements for Evolved Universal Terrestrial Radio Access (E-UTRA) (LTE-Advanced) (Release 8)," 3GPP TR 36.913, V8.0.1, Mar. 2009, 15 pages.

"3rd Generation Partnership Project; Technical Specification Group Radio Access Network; Further Advancements for E-UTRA Physical Layer Aspects (Release 9)," 3GPP TR 36.814, V1.5.0, Nov. 2009, 53 pages.

"3rd Generation Partnership Project; Technical Specification Group Radio Access Network; Evolved Universal Terrestrial Radio Access (E-UTRA); Physical Layer Procedures (Release 9)," 3GPP TS 36.213, V9.0.1, Dec. 2009, 79 pages.

European Extended Search Report, Application No. 11762011.2, Applicant Huawei Technologies, Co., Ltd., Apr. 24, 2013, 8 pages.

"UL-MIMO with Antenna Gain Imbalance," TSG-RAN WG1 #56, R1-090795, Agenda Item: 12.3, Source: Motorola, Documents for: Discussion, Athens, Greece, Feb. 9-13, 2009, 7 pages.

"UL power control for SU-MIMO transmissions," 3GPP TSG RAN WG1 Meeting #58bis, R1-094099, Agenda Item: 7.6.4, Source: Samsung, Document for: Discussion and Decision, Miyazaki, Oct. 12-16, 2009, 3 pages.

LTE; Evolved Universal Terrestrial Radio Access (E-UTRA); Physical layer procedures (3GPP TS 36.213 version 9.0.1 Release 9), ETSI TS 136 213 V9.0.1, Technical Specification, Lte, Jan. 2010, 81 pages.

3rd Generation Partnership Project; Technical Specification Group Radio Access Network; Evolved Universal Terrestrial Radio Access (E-UTRA); Physical layer procedures (Release 10), 3GPP TS 36.213 V10.2.0, Technical Specification, Lte, Jun. 2011,120 pages.

3rd Generation Partnership Project: Technical Specification Group Services and System Aspects; 3GPP System Architecture Evolution; Security Architecture; (Release 8), 3GPP TS 33.abc V1.0.0, Technical Specification , Global System fo Mobile Communications, Feb. 2008, 34 pages.

3rd Generation Partnership Project; Technical Specification Group Services and System Aspects; 3GPP System Architecture Evolution (SAE): Security architecture; (Release 8), 3GPP TS 33.401 V8.6.0, Technical Specification, Lte, Dec. 2009, 98 pages.

3rd Generation Partneship Project; Technical Specification Group Services and System Aspects; 3GPP System Architecture Evolution (SAE): Security architecture; (Release 9), 3GPP TS 33.401 V9.2.0, Technical Specification, Dec. 2009, 104 pages.

"UL Power Control for Multi-Antenna UE," 3GPP TSG RAN1#60, RI-101115, Agenda Item: 7.1.5, Source: Motorola, Document for: Discussion/Decision, San Francisco, USA, Feb. 22-26, 2010, 7 pages.

"UL power headroom report and SU-MIMO power control," 3GPP TSG RAN WG1 Meeting #60, RI-101149, Agenda Item: 7.1.5, Source: Samsung, Document for: Discussion and Decision,San Francisco, USA, Feb. 22-26, 2010, pp. 1-4.

"3rd Generation Partnership Project; Technical Specification Group Services and System Aspects; 3GPP System Architecture Evolution (SAE); Security architecture (Release 10)," 3GPP TS 33.401 V10.0.0, Technical Specification, Lte, Mar. 2011, 113 pages.

"3rd Generation Partnership Project; Technical Specification Group Services and System Aspect; 3GPP System Architecture Evolution (SAE); Security architecture (Release 11)," 3GPP TS 33.401 V11.0.1, Technical Specification, Lte, Jun. 2011, 115 pages.

International Search Report and Written Opinion of Patent Cooperation Treaty (PCT), International Application No. PCT/CN2011/072324, Applicant Huawei Technologies Co., Ltd., et al., date of mailing Jul. 7, 2011, 7 pages.

First Japanese Office Action of Japanese Application No. 2013-501616, mailed Feb. 2, 2014, 6 pages.

"UL Transmission Power Control in LTE-A," 3rd Generation Partnership Project, 3GPP TSG RAN WG1 #58BIS, R1-094086,Technical Specification, Agenda Item: 7.2.5, Samsung, Miyazaki, Japan, Oct. 12-16, 2009, 5 pages.

"UL Transmission Power Control in LTE-A," 3GPP TSG WG1 #58 bis, R1-094086, Samsung, Agenda Item 7.2.5, Oct. 12-16, 2009, 5 pages.

European Communication Pursuant to Article 94(3) EPC in Patent Cooperation Treaty Application No. 11762011.2-1852, mailed Jun. 17, 2014, 5 pages.

"Uplink Power Control for LTE-Advanced," 3GPP TSG RAN WG1 #59bis Meeting, R1-100322, Nokia Siemens Networks, Nokia, Agenda Item 7.1.7, Document for: Discussion and Decision, Valencia, Spain, Jan. 18-22, 2010, 8 pages.

\* cited by examiner

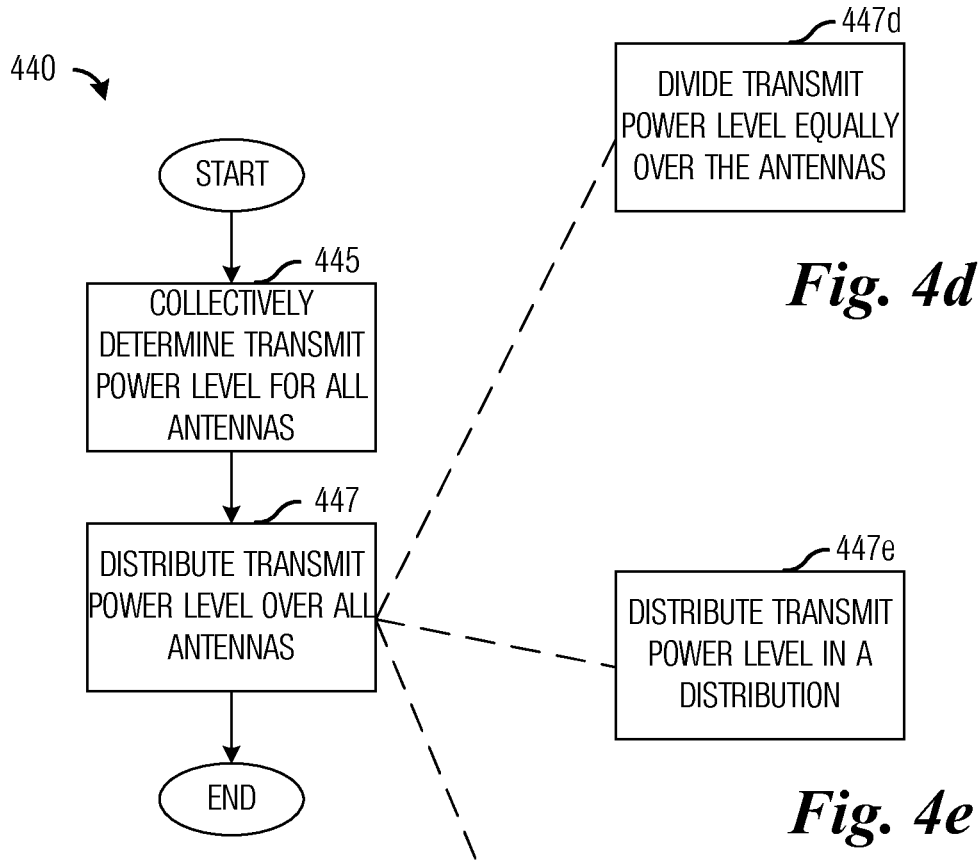
*Fig. 4c*
*Fig. 4d*
*Fig. 4e*
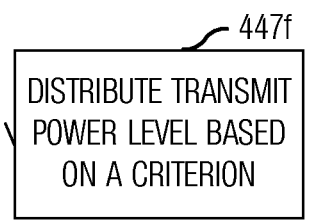
*Fig. 4f*

700 ↘

```
SRS POWER CONTROL OF EACH LAYER/
CODEWORD IS TIED TO POWER
CONTROL OF PUSCH OF SAME LAYER/
CODEWORD & OFFSET
```

```
SRS POWER CONTROL OF ANTENNAS IS
TIED TO SUM POWER CONTROL OF
PUSCH & OFFSET
```

*Fig. 7b*

SYSTEM AND METHOD FOR UPLINK MULTI-ANTENNA POWER CONTROL IN A COMMUNICATIONS SYSTEM

This application claims the benefit of U.S. Provisional Application No. 61/320,058, filed on Apr. 1, 2010, entitled "Uplink Multi-Antenna Power Control for LTE Advanced," which application is hereby incorporated herein by reference.

TECHNICAL FIELD

The present invention relates generally to digital communications, and more particularly to a system and method for uplink multi-antenna power control in a communications system.

BACKGROUND

Generally, a transmit power level of an uplink channel from a User Equipment (UE, also commonly referred to as a Mobile Station, Terminal, User, Subscriber, and so forth) to an enhanced NodeB (eNB, also commonly referred to as a Base Station, NodeB, Controller, and so on) may be set at a determined level to achieve a desired level of uplink performance, help maximize battery life of the UE as well as mitigate interference to other UEs and eNBs, as well as other electronic devices, operating in the general vicinity of the UE. Furthermore, the proper setting of the transmit power level may also help improve multiple input, multiple output (MIMO) antenna performance. Setting the transmit power level may often be referred to as power control.

In The Third Generation Partnership Project (3GPP) Long Term Evolution (LTE) Release Eight (Rel-8) technical standards, uplink power control is specified only for single transmit antenna situations. However, in subsequent releases of the 3GPP LTE technical standards, such as Rel-10 and beyond (also known as LTE-Advanced), uplink Single User MIMO (SU-MIMO) also known as spatial multiplexing is introduced and uplink power control needs to be extended to handle situations with UEs having multiple transmit antennas. Uplink power control over multiple transmit antennas is especially important in the case of multiple layer/multiple codeword transmissions.

Currently used techniques for multiple transmit antenna power control involve the use of extensions of existing single transmit antenna power control schemes, which may not provide optimal results in multiple transmit antenna situations.

SUMMARY OF THE INVENTION

These and other problems are generally solved or circumvented, and technical advantages are generally achieved, by example embodiments of the present invention which provide a system and method for uplink multi-antenna power control in a communications system.

In accordance with an example embodiment of the present invention, a method for user equipment operations is provided. The method includes determining, at a user equipment, a transmit power level for transmit antennas of the user equipment having at least two transmit antennas, and setting a power amplifier output level for each of the at least two transmit antennas in accordance with a respective transmit power level.

In accordance with another example embodiment of the present invention, a method for user equipment operations is provided. The method includes determining, at a user equipment, a transmit power level for each of at least two transmit antennas of the user equipment, and setting a power amplifier output level for each of the at least two transmit antennas in accordance with a respective transmit power level. The power output level determination takes into account a sum of transmit powers for the at least two transmit antennas.

In accordance with another example embodiment of the present invention, a user equipment is provided. The user equipment includes a transmit power processor, and a power setting unit coupled to the transmit power processor. The transmit power processor is operable to determine a transmit power level for transmit antennas of the user equipment. The user equipment includes at least two transmit antennas. The power setting unit sets a power amplifier output level for each of the transmit antennas in accordance with a respective transmit power level. The transmit power processor can be a processing device having applicable processing circuitry, I/O, memory (RAM, ROM) and the like, as is well known in the art.

One advantage disclosed herein is that a number of techniques for multiple uplink transmit antenna power control are presented, allowing power control for channels to be applied on a per-antenna, per layer and/or per codeword, or total power basis.

A further advantage of exemplary embodiments is that transmission format may also be considered in setting multiple uplink transmit antenna power control.

The foregoing has outlined rather broadly the features and technical advantages of the present invention in order that the detailed description of the embodiments that follow may be better understood. Additional features and advantages of the embodiments will be described hereinafter which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which:

FIG. 4c illustrates an example of a flow diagram of operations in determining a transmit power level for transmit antennas of a UE having multiple transmit antennas, wherein the transmit power level for the multiple transmit antennas is considered as a single collective transmit power according to example embodiments described herein;

FIGS. 4d through 4f illustrate examples of flow diagrams of operations in distributing the single collective transmit power according to example embodiments described herein;

FIG. 7a illustrates an example of a flow diagram of operations in power control of the SRS with the SRS being precoded according to example embodiments described herein;

FIG. 7b illustrates an example of a flow diagram of operations in power control of the SRS with the SRS not being precoded according to example embodiments described herein;

DETAILED DESCRIPTION OF ILLUSTRATIVE EMBODIMENTS

The making and using of the current example embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to example embodiments in a specific context, namely a 3GPP LTE-Advanced compliant communications system with UEs having multiple transmit antennas. The invention may also be applied, however, to other communications systems that support UEs with multiple transmit antennas, such as WiMAX, and so forth.

Figure 1:
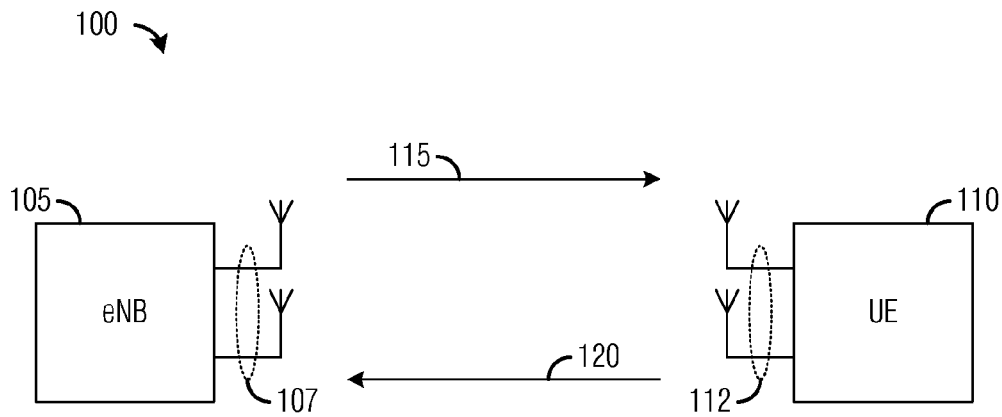
FIG. 1 illustrates an example communications system.

FIG. 1 illustrates a communications system 100. Communications system 100 includes an eNB 105 and a UE 110 with eNB 105 serving UE 110, i.e., transmissions to and from UE 110 need be allowed by and to go through eNB 105. eNB 105 may include a plurality of antennas 107, which may include one or more transmit antenna and one or more receive antenna. Similarly, UE 110 may include a plurality of antennas 112, which may include one or more transmit antenna and one or more receive antenna.

Transmissions from eNB 105 to UE 110 may be referred to as downlink (DL) transmissions and may occur over one or more DL channels (shown as DL channel 115). Similarly, transmissions from UE 110 to eNB 105 may be referred to as uplink (UL) transmissions and may occur over one or more UL channels (shown as UL channel 120). The UL channels include a UL data channel, for example, a Physical UL Shared Channel (PUSCH), a UL control channel, for example, a Physical UL Control Channel (PUCCH), and a UL sounding signal, for example UL sounding reference symbol (SRS).

In 3GPP LTE-Advanced, UE with multiple transmit antennas are introduced to support multiple layers and/or multiple codewords UL SU-MIMO transmission in order to fulfill performance requirements on peak data rate and peak spectral efficiency, for example. Therefore, the UL power control mechanism for 3GPP LTE should be extended to support multiple transmit antenna UEs, especially for multiple layer data transmissions.

It has been agreed to in 3GPP meetings that UL power control in LTE-Advanced is to be similar to UL power control used in 3GPP LTE Rel-8 and Rel-9, with additional considerations given for multiple transmit antenna UEs, including:
UL power control mainly compensates for slow-varying channel conditions while reducing interference generated towards neighboring cells; and
Fraction path-loss compensation or full path loss compensation is used on Physical UL Shared Channel (PUSCH) and full path-loss compensation is used on Physical UL Control Channel (PUCCH).

In addition, since 3GPP LTE-Advanced supports the use of component carriers (CC) for carrier aggregation, CC specific UL power control scenarios must be considered.

Figure 2:
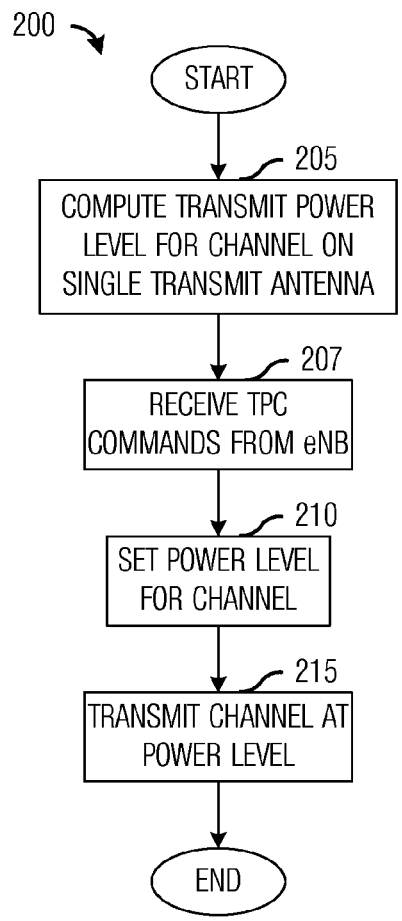
FIG. 2 illustrates an example flow diagram of operations for transmitting information.

FIG. 2 illustrates a flow diagram of operations 200 for transmitting information. Operations 200 may be indicative of operations occurring in a UE, such as UE 110, as the UE transmits information using UL power control, where the UE has a single transmit antenna. Operations 200 may occur while the UE is in a normal operating mode and is being served by an eNB, such as eNB 105.

Operations 200 may begin with the UE computing a transmit power level for different channels in its UL (block 205). The UE may separately compute a transmit power level for each channel that it transmits, such as for the PUSCH and the PUCCH, and independently sets the transmit power level for each channel.

As an example, consider the PUSCH, according to the 3GPP LTE Rel-8 and Rel-9 technical standards, the setting of the UE transmit power level may be defined as:

$$P_{PUSCH}(i) = \min\{P_{CMAX}, 10\log_{10}(M_{PUSCH}(i)) + P_{O\_PUSCH}(j) + \alpha(j) \cdot PL + \Delta_{TF}(i) + f(i)\},$$

where
$P_{CMAX}$ is the configured UE transmitted power;
$M_{PUSCH}(i)$ is the bandwidth of the PUSCH resource assignment expressed in number of resource blocks valid for subframe i;
$P_{O\_PUSCH}(j)$ is a parameter configured by the eNB;
$\alpha \in \{0, 0.4, 0.5, 0.6, 0.7, 0.8, 0.9, 1\}$ is a cell specific parameter provided by higher layers;
PL is the DL pathloss estimate calculated in the UE in dB and PL=referenceSignalPower−higher layer filtered reference signal received power (RSRP);

$\Delta_{TF}(i) = 10 \log_{10}((2^{MPR \cdot K_S} - 1)\beta_{offset}^{PUSCH})$ for $K_S = 1.25$ is the power offset based on the transmission format and it can be turn off (equal to 0) for $K_S = 0$ and $\beta_{offset}^{PUSCH}$ is a configured parameter; and The current PUSCH power control adjustment state is given by $f(i)$.

As another example, consider the PUCCH, according to the 3GPP LTE Rel-8 and Rel-9 technical standards, the setting of the UE transmit power level may be defined as:

$$P_{PUCCH}(i) = \min\{P_{CMAX}, P_{0\_PUCCH} + PL + h(n_{CQI} + n_{HARQ}) + \Delta_{F\_PUCCH}(F) + g(i)\},$$

where

The parameter $\Delta_{F\_PUCCH}$ is provided by higher layers. Each $\Delta_{F\_PUCCH}(F)$ value corresponds to a PUCCH transmission format (F);

$h(n_{CQI}, n_{HARQ})$ is a PUCCH format dependent value, where $n_{CQI}$ corresponds to the number of information bits for the channel quality information and $n_{HARQ}$ is the number of Hybrid Automatic Repeat Requested (HARQ) bits;

$P_{O\_PUCCH}$ is similar to $P_{O\_PUSCH}$ and is configured by the eNB; and $g(i)$ is the current PUCCH power control adjustment state.

Furthermore, for UL SRS, the setting of the UE transmit power level may be defined as:

$$P_{SRS}(i) = \min\{P_{CMAX}, P_{SRS\_OFFSET} + 10 \log_{10}(M_{SRS}) + P_{O\_PUSCH}(j) + \alpha(j) \cdot PL + f(i)\}.$$

The power control of SRS may be tied to the power control of the PUSCH of the UE with an offset value $P_{SRS\_OFFSET}$ and $M_{SRS}$ is the bandwidth of the SRS transmission.

As discussed above, the 3GPP LTE Rel-8 and Rel-9 UL power control assumes a single transmit antenna at the UE and a single layer for UL transmission. In 3GPP LTE Rel-10 and beyond, UEs with multiple transmit antennas (and hence multiple power amplifiers (PA)) are supported and UL data transmission may use multiple layers. Additionally, transmit diversity may be used for UL data transmission. Therefore, extension and/or enhancement of the Rel-8 and Rel-9 power control schemes is needed.

After computing the transmit power level for the different channels in the UL, the UE may set the transmit power level for a channel that it is preparing to transmit by setting its power amplifier (PA) in accordance with a computed transmit power level that corresponds to the channel that it is preparing to transmit (block 210) and then transmit the channel (block 215).

Additionally, the eNB may send transmit power control (TPC) commands to the UE to adjust the transmit power of the UL channels of the UE. The TPC commands from the eNB portion of the power control mechanism is commonly referred to as closed loop power control while the remainder of the power control mechanism is called open loop power control. The closed loop power control may be used to adjust the transmit power on top of the output of the open loop power control formula. The TPC commands may be sent separately for each of the UL control channels, such as PUSCH and PUCCH. The UE receives the TPC commands (shown in FIG. 2 as block 207) and adjusts the power control adjustment state for the corresponding UL channel.

Figure 3:
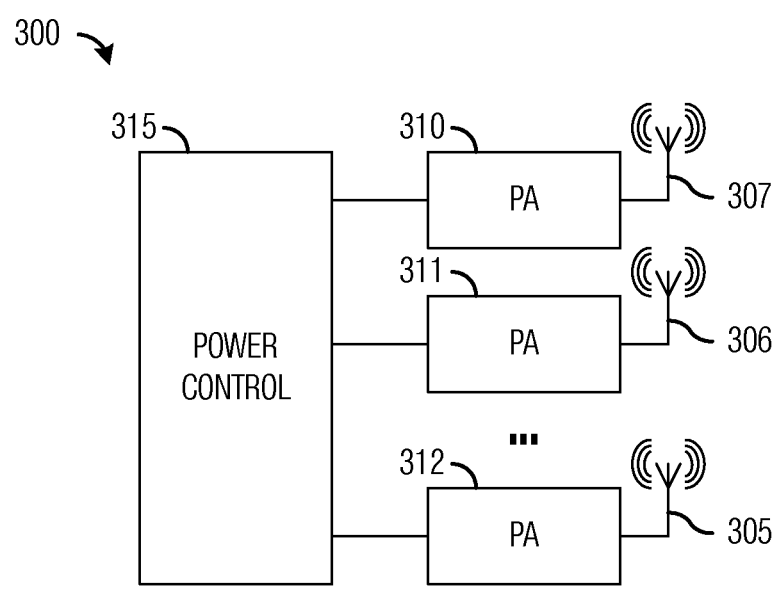
FIG. 3 illustrates an example of a portion of a UE with multiple transmit antennas according to example embodiments described herein.

FIG. 3 illustrates a portion of a UE 300 with multiple transmit antennas. As shown in FIG. 3, a portion of UE 300 responsible for transmitting information over multiple antennas is shown. Other circuitry in UE 300, including receive circuitry, processing circuitry, as well as other circuitry that may be used to provide operability, user interaction, power, and so forth, are well understood in the field of telecommunications and are not shown. FIG. 3 illustrates an illustrative example of a UE architecture, it being understood that other UE architectures for PAs and antennas are possible. Therefore, the UE architecture shown in FIG. 3 should not be construed as being limiting to either the scope or the spirit of the example embodiments.

UE 300 includes multiple transmit antennas, such as antenna 305, antenna 306, and antenna 307. Coupled to each transmit antenna may be a power amplifier (PA), such as PA 310, PA 311, and PA 312, responsible for amplifying a signal to be transmitted to a power level set by a power control unit 315. Power control unit 315 may issue power control commands to a PA to have the PA set an amplification level for a signal to be amplified by the PA. The power control command may be in the form of an absolute power level or a difference power level relative to a previously provided power level.

According to an example embodiment, power control unit 315 may determine a power level for each of the multiple transmit antennas in several different ways. Power control unit 315 may determine the power level for the transmit antennas using per antenna power control, per layer and/or per codeword power control, sum power control, or combinations thereof, techniques. A detailed discussion of the different ways for determining the power level for the multiple transmit antennas is provided below.

Power control unit 315 may make use of information provided by an eNB serving UE 300, cell specific information, UE specific information, information measured by UE 300, technical standard specified information, and so forth, in determining the power level for the transmit antennas. Furthermore, power control unit 315 may also make use of information regarding a transmission format (TF) of transmissions to be made by a transmit antenna in determining the power level. A detailed discussion of the information utilized by power control unit 315 is also provided below.

It may appear to be natural to extend component carrier—(CC) specific power control concepts to support multiple transmit antennas. However, such is not the case, as there can be a multitude of options that may need to be considered when extending the CC-specific power control concepts to multiple transmit antennas, including per antenna power control, per layer and/or per codeword power control, sum power control, or combinations thereof.

Figure 4A:
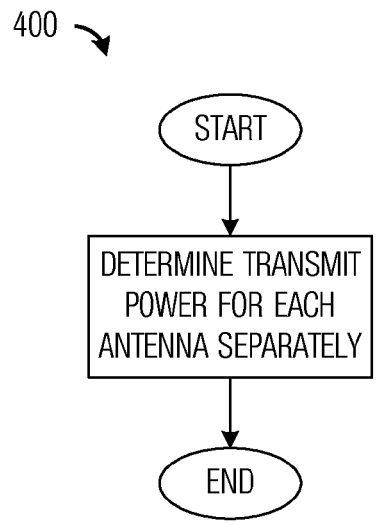
FIG. 4a illustrates an example of a flow diagram of operations in determining a transmit power level for transmit antennas of a UE having multiple transmit antennas, wherein each transmit antenna is considered separately according to example embodiments described herein.

FIG. 4a illustrates a flow diagram of operations 400 in determining a transmit power level for transmit antennas of a UE having multiple transmit antennas, wherein each transmit antenna is considered separately. According to an example embodiment, the UE may determine a transmit power level for the different channels in the UL for each transmit antenna on a per-antenna basis. With per-antenna transmit power control, the transmit power of each antenna may be computed and set. The transmit power of each antenna may be computed and set independently of one another.

According to an example embodiment, the above provided transmit power formulas for the PUSCH ($P_{PUSCH}(i)$) and PUCCH ($P_{PUCCH}(i)$) may be used for each of the transmit antennas of the UE with relatively minor modifications.

Per-antenna power control may be used to compensate for antenna gain imbalance (AGI). However, the performance gain from per-antenna power control may be small. Furthermore, in order to compensate for AGI, the transmission power of each antenna's PA may need to be different, which complicates power headroom reports (used to provide residual power reports to the eNB), eNB scheduling and resource allocation, and maximum power scaling (in case of power limitation). Additionally, with fractional path loss compensation (α<1), the power control formulas used in 3GPP LTE Rel-8 does not totally compensate the AGI and additional mechanisms are needed.

In order to support per-antenna power control, the following may be needed:

Separate path-loss estimations (PL terms in equations for the PUSCH ($P_{PUSCH}(i)$) and PUCCH ($P_{PUCCH}(i)$)) for each transmit antenna at the UE are needed. The path-loss estimations may be derived from the separate reference signal received power (RSRP) measurements for each of the transmit antennas measured at the UE side based on a DL reference signal. In addition, the RSRP measurements also need to be reported to the eNB. Note that, with multiple RSRP measurements, a single RSRP value from these multiple RSRP measurements may be used for other purpose, such as handover. The single RSRP may be calculated at the eNB (by averaging, for example) or reported by the UE. Also note that a single path loss estimation is needed for single antenna port transmission mode which can be configured by the eNB for the UEs with multiple transmit antennas.

Separate transmit power control (TPC) commands may be needed for each antenna which may be sent in UL grants in Physical DL Control Channel (PDCCH) or a TPC-PDCCH with increased overhead. Even for single layer or single antenna port transmissions, multiple TPC commands may still be needed.

Multiple power headroom reports are needed for all the transmit antennas. In the case of single antenna port transmission mode, since it is up to UE implementation, multiple antennas may be involved and there will be an impact on the path loss measurement/report and PHR.

With separate path loss compensation and/or TPC commands, different transmit power of the antennas may result in different maximum power scaling in the case of power limitation of some or all of the antennas and/or PAs, or in the case of power limitation on the sum power. The separate maximum power for each antenna and/or PA needs to be defined and it may be necessary to have the UE inform the eNB of its RF architecture including a maximum power of each PA. Power scaling scheme may be up to UE implementation or it may be guided by rules such as:

a) First, scale down the antenna and/or PA that exceeds its configured maximum power; and b) Then scale equally across all the antennas and/or PAs to fulfill the maximum sun power.

To compensate for AGI, simply plugging in different path loss values for each antenna into the fractional power control formula on a per-antenna basis will not work in a situation when α is less than one. Therefore the power control formula needs to be modified to always perform full path loss difference compensate even when α is less than one. One possible solution is to use a single reference path loss in the fractional power control term while another term is added to compensate for the path loss difference between the reference path loss and the path loss of each antenna involved. The reference path loss may be the path loss of a pre-defined and/or configured antenna, the average of the path loss of all the antennas, or a combination thereof.

Although the power control parameters, such as $P_{O\_PUSCH}$ (or $P_{O\_PUCCH}$), fractional power control factor α, and so forth, may be set independently for each transmit antenna, there may be little reason to do so due to the added complexity of independent parameter setting. Therefore, in an interest in reducing overall complexity, full compensation for path loss difference, i.e., AGI, between the transmit antennas in addition to the 3GPP LTE Rel-8 and Rel-9 fractional power control may be good candidates for independent parameter setting.

Figure 4B:
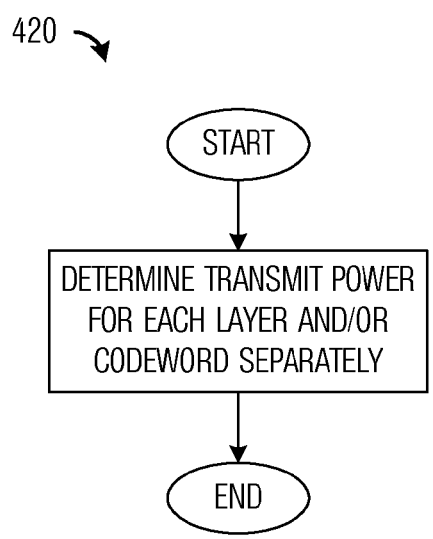
FIG. 4b illustrates an example of a flow diagram of operations in determining a transmit power level for transmit antennas of a UE having multiple transmit antennas, wherein each transmission layer and/or codeword is considered separately according to example embodiments described herein.

FIG. 4b illustrates a flow diagram of operations 420 in determining a transmit power level for transmit antennas of a UE having multiple transmit antennas, wherein each transmission layer and/or codeword is considered separately.

In general, for a UE with Nt transmit antenna ports, the UE may typically perform SU-MIMO transmissions involving N transmission layers where N≤Nt. Each SU-MIMO transmission layer may be associated with a set of precoding weights, which may be applied to one of the Nt transmit antenna ports. A precoder is considered to then be a set of precoding weights, with one precoder for each transmission antenna and each transmission layer. A MIMO transmission layer is also commonly known as a MIMO stream.

The N layer SU-MIMO transmission may be divided into one or more codewords where each codeword may be mapped to one or more transmission layers. Each codeword comprises one or more data code blocks (CB) which are collectively called a transport block (TB). All the transmission layers associated with a codeword are of the same modulation and coding scheme (MCS) while transmission layers associated with different codewords may have different MCS levels. The MCS levels of the codewords may be independently determined at the eNB and signaled to the UE.

If the CB(s) of a codeword is not received correctly at the receiver, for example, by failing a Cyclic Redundancy Check (CRC), a retransmission of the TB may occur. The retransmission of the TBs of the different codewords may be performed independently. According to an example embodiment, the UE may compute a transmit power level for the different channels in the UL for each transmit antenna on a per layer and/or per codeword basis. In the case of single layer SU-MIMO transmission, per layer and/or per codeword power control should be the same as Single Input-Multiple Output (SIMO) power control. With multiple layers and/or codewords, the power of each layer and/or codeword may need to be determined, and if separately, by per layer and/or per codeword power control.

According to an example embodiment, the above provided transmit power formulas for the PUSCH ($P_{PUSCH}(i)$) and PUCCH ($P_{PUCCH}(i)$) may be used for each of the transmit antennas of the UE on a per layer and/or codeword basis with relatively minor modifications. The modifications are discussed in detail below.

In order for per layer and/or per codeword power control, the following parameters for PUSCH power control (and similarly PUCCH power control) may be separately set for each layer and/or codeword: $P_{O\_PUSCH}$ (or $P_{O\_PUCCH}$), α, $\Delta_{TF}$, and f(i), where $P_{O\_PUSCH}$ (or $P_{O\_PUCCH}$) is a parameter configured by the eNB, $\alpha \in \{0, 0.4, 0.5, 0.6, 0.7, 0.8, 0.9, 1\}$ is a cell specific parameter provided by higher layers, $\Delta_{TF}$ is in accordance with a transmission format used in the UL channel, and f(i) (or g(i)) is the current PUSCH (or PUCCH) power control adjustment state.

Theoretically $P_{O\_PUSCH}$ (or $P_{O\_PUCCH}$) and α may be set to different values for different layers and/or codewords. However, setting $P_{O\_PUSCH}$ (or $P_{O\_PUCCH}$) and α independently may add complexity while obtaining relatively small gain in return. Therefore, $\Delta_{TF}$ and f(i) may be separately set for each layer and/or codeword since independently setting $\Delta_{TF}$ and f(i) may result in significant gains. However, $\Delta_{TF}$ is generally not a viable option for SU-MIMO power control. As for f(i), though different values of the power control status of each layer and/or codeword may be beneficial to optimize the SU-MIMO performance, maintaining multiple values of f(i) (and hence multiple power control processes) for the spatial layers/codewords may be interrupted by dynamic rank adaptation and/or dynamic precoding selection where the number of layers and precoder of PUSCH transmission may be selected dynamically or semi-statically due to either time-varying channel condition or scheduler's decision.

According to an alternative example embodiment, one common f(i) (and hence one power control process) is maintained for all the layers and/or codewords while an offset relative to the common power control process may be signaled dynamically in a PDCCH or semi-statically in RRC in the case of multiple layers and/or codewords transmissions. A single path loss is then used for UL multiple antenna power control.

FIG. 4c illustrates a flow diagram of operations 440 in determining a transmit power level for transmit antennas of a UE having multiple transmit antennas, wherein the transmit power level for the multiple transmit antennas is considered as a single collective transmit power (referred to herein as a sum power). According to an example embodiment, the UE may determine, through the operation of appropriate processing circuitry (processor, input/output (I/O), and memory (not shown)) a transmit power level for the different channels in the UL for each transmit antenna on a sum power basis. Controlling the sum power in the case of multiple layers and/or codewords transmission may be similar to the case of SIMO power control.

According to an example embodiment, the above provided transmit power formulas for the PUSCH ($P_{PUSCH}(i)$) and PUCCH ($P_{PUCCH}(i)$) may be used for a sum power for all of the transmit antennas of the UE in combination with relatively minor modifications (block 445).

With the sum power computed, the transmit power level for each of the transmit antennas of the UE may be determined, i.e., distributed (block 447). The sum power may be shared (distributed) across antennas, layers, and/or codewords. Sharing of the sum power may be through a fixed rule, semi-static radio resource management (RRM or RRC) configuration, dynamically controlled by PDCCH signaling, or combinations thereof.

According to an example embodiment, the transmit power may be scaled. As an example, the transmit power of an antenna and/or PA may be scaled by a ratio of a number of transmit antennas transmitting a channel for which power control is being performed to a number of transmit antennas available for use in transmitting. Consider a case wherein the channel for which power control is being performed is a PUSCH, then the transmit power may be scaled by a ratio of the number of transmit antennas with a non-zero PUSCH transmission to the number of transmit antennas available for use in the transmission scheme.

The manner by which transmit power is be distributed (block 447) can be accomplished in a number of different ways, as illustrated in FIGS. 4d-4f. For example, with a fixed rule or in a default mode, the sum transmission power determined by the power control formula may be divided (distributed) equally or substantially equally to all the antennas and/or PAs to best utilize the PA power (shown as block 447d in FIG. 4d). Alternatively, the sum transmission power determined by a power control formula may be divided (distributed) based on a weighting and/or distribution applied to the various transmit antennas (shown as block 447e in FIG. 4e). For example, the weighting may be based on the antenna's path loss, distance to eNB, channel quality, channel information, and so on. Additionally, the sum transmission power determined by a power control formula may be divided (distributed) based on a criterion (shown as block 447f in FIG. 4f). Examples of criterions may include antenna's path loss, distance to eNB, channel quality, channel information, channel error rate, UE priority, quality of service requirements, and so forth.

When a cubic-metric preserve (CMP) codebook is used for UL SU-MIMO, the total transmission power of each layer and/or codeword is just the sum power of the involved antennas and/or PAs. If more dynamic and flexible power sharing is seen beneficial, offset values may be signaled semi-statically by radio resource control (RRC) signaling or dynamically by PDCCH for multiple layer and/or codeword transmissions to control the distribution of the sum power. If offset values are used, an offset value for each transmission codeword and/or relative offset values between the codewords may be needed. One way to convey the codeword offset value(s) may be to send the offset value(s) in a scheduling grant for the PUSCH. Assuming two codewords per transmission, one TPC field in the PDCCH is still needed for the sum power control as in Rel-8 and/or Rel-9, while one additional field is needed in the PDCCH to indicate the relative offset value between the two codewords. In the case of non-adaptive retransmission without a PDCCH, the offset value provided in a previous PDCCH of the UE may be used.

A single path loss is used herein for UL multiple antenna power control where the path loss may be an average path loss over multiple antennas. A more complicated combination of per-antenna path loss compensation with the sum power control may be considered where the sum power determined by the power control formula using a reference and/or average path loss may be divided by the involved antennas according to the path loss of the antennas. According to another example embodiment, the sum power determined by the power control formula using a reference and/or average path loss may be first divided to the codewords as discussed above and the power of each codeword is then divided by the involved antennas based on their path loss.

In addition to computing a transmit power level for different channels in its UL for each of the multiple transmit antenna, the UE may also optionally utilize the transmission format (TF) used in the UL transmission of a channel in computing the transmit power. The transmission format is also known as modulation and coding scheme (MCS) level for a transmission. In the 3GPP LTE Rel-8 and/or Rel-9 PUSCH power control formula discussed previously (the transmit power formula for the PUSCH ($P_{PUSCH}(i)$)), a TF based power offset can be implemented through the term $\Delta_{TF}$ by setting $K_S=1.25$, for example.

The TF based power offset may be very flexible since it allows the eNB to dynamically control the transmission power spectral density (PSD) of the PUSCH of each UE by selecting an appropriate TF which is then mapped to a desired PSD through the expression $\Delta_{TF}$ thereby linking TF and PSD. However, such an approach may be problematic in the case of multiple layers and/or codewords transmission with a multiple transmit antenna UE.

For discussion purposes, consider a UE with two transmit antennas and uplink SU-MIMO with two layers and/or codewords transmission. Equal transmission PSD for the two antennas, layers, and/or codewords usually results in different supportable transmission formats for the two layers and/or codewords and a TF offset between the two codewords may change with time. As another example, in the scenario wherein inter-layer interference is a dominant source of interference, increasing PSD needs not increase TF. Therefore, a simple mapping between the TFs of the two codewords and the corresponding PSD may not exist.

There may be many factors that determine the mapping between PSD and TF in the case of SU-MIMO for a specific subframe. These factors include: the instantaneous spatial channel condition, precoder selected, receiver design, AGI, and so on. Even with perfect AGI compensation and fast per antenna power control, the relationship between the PSD and the TF of the codewords may change from subframe to subframe and can not be easily captured in a closed form.

If TF based power offset is not feasible for multiple layer and/or codeword transmissions, and even though it might still work with single layer only transmission, it should not be used for UL SU-MIMO mode when multiple layer and/or codeword transmission is allowed.

According to an example embodiment, a power offset may only be used to adjust the transmit power for a codeword while operating in a SIMO transmission mode, i.e., $K_S$ large than zero may be configured, while for MIMO transmission mode, $K_S$ can only be set to zero and so that the power offset term is always equal to zero.

To perform TF based power offset in the case of multiple layer and/or codeword transmission, multiple options are available for performing TF based power offset.

Figure 5A:
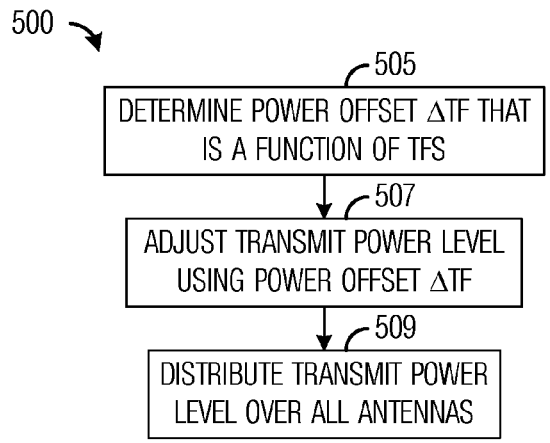
FIG. 5a illustrates an example of a flow diagram of operations in performing TF based power offset, wherein a power offset $\Delta_{TF}$ may be determined based on a combined TF for multiple codewords according to example embodiments described herein.

FIG. 5a illustrates a flow diagram of operations 500 in performing TF based power offset, wherein a power offset $\Delta_{TF}$ may be determined based on a combined TF for multiple codewords. The power offset $\Delta_{TF}$ may be derived from a combination of TF from multiple codewords (block 505) and the power offset may be used to adjust the transmit power level (block 507) with the transmit power level being distributed over all transmit antennas (block 509). An example may be to use the average TF for all the codeword to calculate $\Delta_{TF}$ and the sum power is then divided (distributed) to the codewords as discussed in the case of sum power control. The formula and/or values of parameters for $\Delta_{TF}$ in the case of multiple layer and/or codeword may be different to that of a single layer and/or codeword transmission and that of single antenna transmission. Other ways to derive the combined TF may be to use the TF of predefined codewords, to use largest or smallest TF of the codewords, to use a weighted average of the TFs of the codewords, and so on.

Figure 5B:
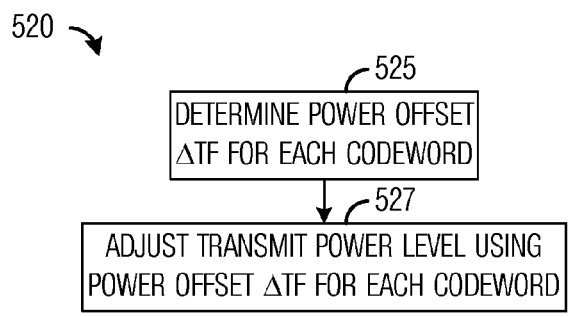
FIG. 5b illustrates an example of a flow diagram of operations in performing TF based power offset, wherein a power offset $\Delta_{TF}$ may be determined for each codeword according to example embodiments described herein.

FIG. 5b illustrates a flow diagram of operations 520 in performing TF based power offset, wherein a power offset $\Delta_{TF}$ may be determined for each codeword. The power offset for each codeword may be derived independently (block 525) and the power offset may be used to adjust the transmit power level (block 527). Same or different formulas may be used for each codeword. The formula and/or values of parameters for $\Delta_{TF}$ in the case of multiple layer and/or codeword transmission may be different to that of a single layer and/or codeword transmission and that of single antenna transmission. On top of the power offset, TPC commands and/or additional offset may be signaled by the eNB for each codeword. This is a form of the per-codeword power control scheme.

Figure 5C:
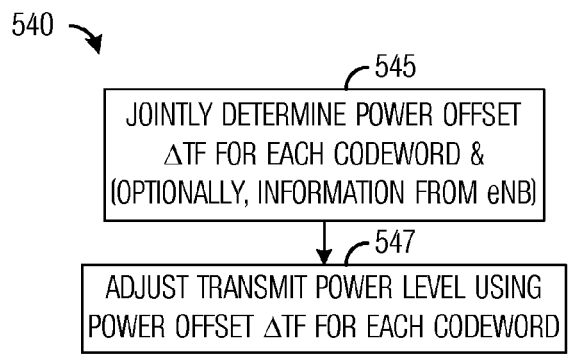
FIG. 5c illustrates an example of a flow diagram of operations in performing TF based power offset, wherein a power offset $\Delta_{TF}$ may be jointly determined according to example embodiments described herein.

FIG. 5c illustrates a flow diagram of operations 540 in performing TF based power offset, wherein a power offset $\Delta_{TF}$ may be jointly determined. The power offset for each codeword may be different but jointly determined based on the TFs of all the codewords and maybe additional information sent by the eNB (block 545) and the power offset may be used to adjust the transmit power level (block 547). The additional information from the eNB may include a set of configured parameters, a selection of the formula for mapping the TFs to the transmit power or PSD, and so on. The additional information may be configured at the eNB based on its knowledge of the system which may include the antenna configuration, the channel characteristics, the receiver design, the power control policy, the interference management consideration, and so forth. The additional information may be sent to the UE as a cell-specific configuration message by, for example, broadcast signaling. In another embodiment, the additional information may be sent to the UE as a dedicated signaling by, for example, RRC signaling.

According to an example embodiment, a shape or a slope of the formula that maps the TFs to the power offset may be configurable. The shape or the slope of the formula may be configured by selecting a non-zero value of $K_S$ from a set of multiple non-zero candidate values. Note that $K_S$ can only be 0 or 1.25 in 3GPP LTE Release-8 and Release-9. Similar formulas may be used to calculate the power offset $\Delta_{TF}$ but based on the TFs of all the codewords and using the selected $K_S$ value where the value can be different from 0 or 1.25. For example, depending on the receiver design, the MIMO channel characteristics, and/or other design considerations, the eNB may configure the UE to use an appropriate $K_S$ value for $\Delta_{TF}$ calculation.

According to the 3GPP technical standards, a variety of UL transmission modes, including UL signal antenna port mode, single antenna port, multiple antenna port, and so on, may be independently configured for PUSCH, PUCCH, and SRS. A transmission mode configuration may have an impact on power control design.

In a scenario wherein a single antenna port transmission mode is configured for a UE with multiple antennas, the implementation of the UE may affect how a single reference path loss is calculated, which antennas are involved in power control, how the antennas are involved in power control, how power headroom(s) is reported, and so forth. Since power control in the single antenna port transmission mode for a multiple transmit antenna UE may operate as power control in a UE with a single transmit antenna (as in 3GPP LTE Rel-8 and Rel-9 UEs), the issues discussed above should be left as UE implementation issues. However, in a case where different transmission modes are configured for PUSCH, PUCCH, and SRS, different path loss values may be used for corresponding power control processes. The different path loss values should be known by the eNB serving the UE.

Figure 6A:
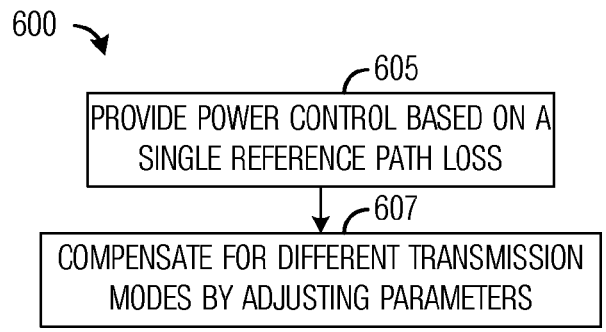
FIG. 6a illustrates an example of a flow diagram of operations in UL power control for a variety of transmission modes with a single reference path loss according to example embodiments described herein.

FIG. 6a illustrates a flow diagram of operations 600 in UL power control for a variety of transmission modes with a single reference path loss. As shown in FIG. 6a, a single reference path loss is used in power control for all the transmission modes of all the channels (block 605). In this case, the UE reports a single RSRP (and hence a single path loss value) to the eNB. A discrepancy from different transmission modes may be compensated for by setting the appropriate and different values of the parameters (e.g., Po, f(i), the TPC commands, and so forth) for the power control processes for the different channels (block 607). In addition, only a single power headroom report is needed for all the transmission modes.

Figure 6B:
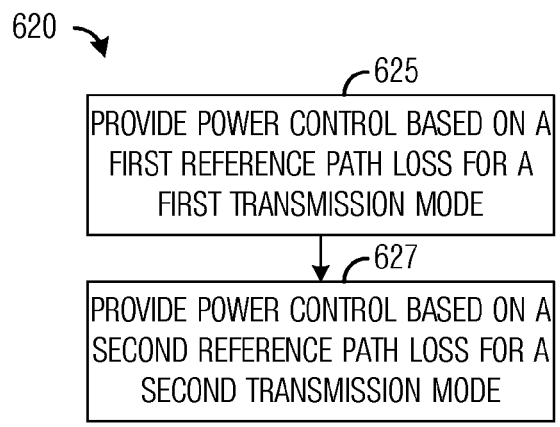
FIG. 6b illustrates an example of a flow diagram of operations in UL power control for a variety of transmission modes with multiple reference path losses according to example embodiments described herein.

FIG. 6b illustrates a flow diagram of operations 620 in UL power control for a variety of transmission modes with multiple reference path losses. As shown in FIG. 6b, a first reference path loss and path losses of the involved antennas are both used in power control for multiple antenna port transmission mode (block 625) while a second reference path loss (potentially different) may be used in power control of single antenna port transmission mode (block 627). It may be possible to restrict the first reference path loss and the second reference path loss to be the same as in the first scenario and to be used for all the channels. The RSRP (and hence path loss) of the individual antenna may be reported to the eNB as well as a reference RSRP (to be used to determine the reference path losses). Note that the reference path losses may be calculated based on a predefined formula from the path losses of the involved antennas. Multiple power headroom reports may be needed for the antennas involved.

Figure 6C:
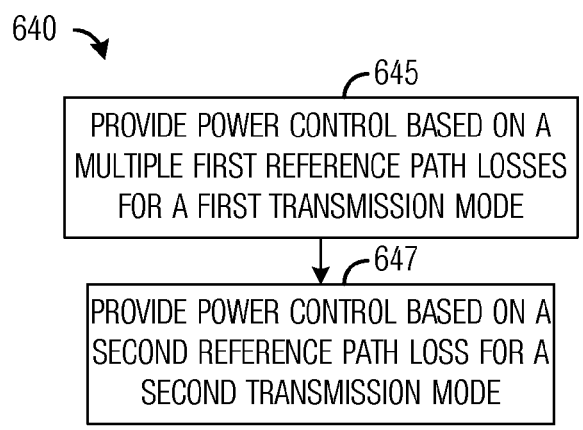
FIG. 6c illustrates an example of a flow diagram of operations in UL power control for a variety of transmission modes with multiple reference path losses for a multiple antenna transmission mode and a single reference path loss for a single antenna transmission mode according to example embodiments described herein.

FIG. 6c illustrates a flow diagram of operations 640 in UL power control for a variety of transmission modes with multiple reference path losses for a multiple antenna transmission mode and a single reference path loss for a single antenna transmission mode. As shown in FIG. 6c, multiple path losses of the involved antennas are used in power control for a multiple antenna port transmission mode (block 645), while a single reference path loss is used in power control of single antenna port transmission mode (block 647). The calculation of the reference path loss may be dependent upon the UE implementation. The RSRP (and hence path loss) of each individual antenna needs to be reported to the eNB as well as the reference RSRP (to be used to determine the reference path loss). Multiple power headroom reports may be needed for the antennas involved.

Multiple transmission modes may be defined in UEs with multiple transmit antennas. The eNB serving the UE may configure and/or switch the transmission mode of the UE if it has reason to do so. As an example, the eNB may switch the transmission mode of the UE to meet a quality of service requirement, to meet a priority requirement, to prevent starvation of a UE, or so on. When the transmission mode changes for PUSCH and/or PUCCH of the UE, the corresponding power control process(es) may be interrupted and some power control parameters may need to be reset.

For the PUSCH, the power control parameter f(i) may be reset to zero when the transmission mode changes. Other power control parameters, such as Po and α, may be adjusted by sending dedicated RRC signaling, which may be decided on by the eNB.

For the PUCCH, the power control parameter g(i) may be reset to zero when the transmission mode changes. Other power control parameters, such as Po and $\Delta_{F\_PUCCH}$, may be adjusted by sending dedicated RRC signaling, which may be decided on by the eNB.

In some situations, such as those shown in FIGS. 5b and 5c, the type of path loss used in power control may need to change, which may trigger the UE to feedback additional RSRP report(s).

According to an example embodiment, if multiple power control processes are used for multiple antenna port transmission mode, such as in per antenna and/or per layer and/or per codeword power control, in order to avoid interruption of the power control processes when a change in transmission mode occurs, separate power control processes used in the multiple antenna port mode and the single antenna port mode may be maintained at the UE.

The power control of the SRS used in 3GPP LTE Rel-8 and Rel-9 is tied to the power control of the PUSCH through an offset value ($P_{SRS\_OFFSET}$) that is configured by the eNB. If different transmission modes are assigned to the PUSCH and the SRS (which is a possibility since the transmission mode for the PUSCH and the SRS may be configured independently), the $P_{SRS\_OFFSET}$ may need to be configured and/or re-configured accordingly. Note that changing of transmission mode of the SRS may not reset f(i).

Furthermore, in order to support a periodic SRS, the UE's configuration of single antenna or multiple antenna transmission modes may be included in the control signaling. For this case, a proper value of $P_{SRS\_OFFSET}$ also needs to be set accordingly and used for all the antennas involved. Several approaches can be used (with an assumption of a single power control process is used for the PUSCH as in the case when sum power control is used). The approaches may include:

Multiple $P_{SRS\_OFFSET}$ values may be semi-statically configured by the eNB and an appropriate value is used according to the transmission mode of SRS and the transmission mode of PUSCH; and $P_{SRS\_OFFSET}$ value or an adjustment is signaled dynamically when a periodic SRS is scheduled.

With multiple power control processes for PUSCH as when per antenna and/or per layer and/or codeword power control is used, a connection between the power control processes of PUSCH and SRS is more complicated. The following situations may be possible in the case of per antenna power control:

The PUSCH and the SRS are both configured in multiple antenna port transmission mode: the power control process of the SRS for an involved antenna may be tied to the power control process of the PUSCH for the same antenna with an offset value $P_{SRS\_OFFSET}$. The offset values for the antennas may be the same or different;

The PUSCH and the SRS are both configured in single antenna port transmission mode: 3GPP LTE Rel-8 power control is used;

The PUSCH is configured in single antenna port mode and the SRS is configured in multiple antenna port transmission mode: power control of the SRS for all the involved antennas are tied to a single power control process of the PUSCH with a single offset value $P_{SRS\_OFFSET}$; and The PUSCH is configured in multiple antenna port mode and the SRS is configured in single antenna port transmission mode: power control of the SRS is tied to the multiple power control processes of the PUSCH based on its implementation of single antenna port mode with a single offset value $P_{SRS\_OFFSET}$.

With per layer and/or codeword power control for the PUSCH, the SRS may use either per antenna or per layer and/or codeword power control. Per layer and/or codeword power control of the SRS requires that the SRS be precoded. It may generally be difficult to have the precoder of the SRS to match that of the PUSCH in the case of dynamic rank adaptation and precoding unless the precoder of the SRS can be changed through dynamic signaling which is possible in the case of a periodic SRS. Therefore, in case of per layer and/or codeword power control of the PUSCH, several different situations may be possible.

FIG. 7a illustrates a flow diagram of operations 700 in power control of the SRS with the SRS being precoded. As shown in FIG. 7a, with the SRS being precoded and using per layer and/or codeword power control, the SRS power control of each layer and/or codeword may be tied to the power control of the PUSCH of the same layer and/or codeword with a offset value $P_{SRS\_OFFSET}$ and the offset value may be the same or different. Note that per layer and/or codeword power control of the PUSCH may also be realized through sum power control with maybe additional offset between the layers and/or codewords.

FIG. 7b illustrates a flow diagram of operations 720 in power control of the SRS with the SRS not being precoded. As shown in FIG. 7b, with the SRS being not precoded and using per antenna power control: if the per layer and/or codeword power control of the PUSCH is realized through sum power control with potentially an additional offset between the layers and/or codewords, the power control of the SRS for the involved antennas may be linked to the sum power control process with a offset value $P_{SRS\_OFFSET}$ and these offset values may be the same or different.

Figure 8:
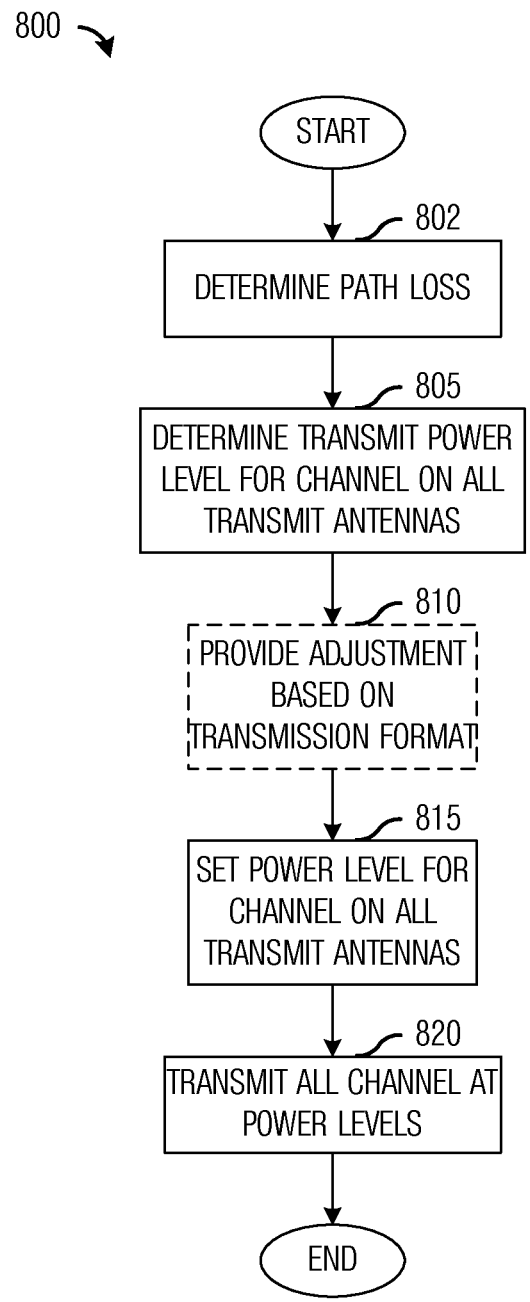
FIG. 8 illustrates an example of a flow diagram of operations for transmitting information according to example embodiments described herein.

FIG. 8 illustrates a flow diagram of operations 800 for transmitting information. Operations 800 may be indicative of operations occurring in a UE, such as UE 110, as the UE transmits information using UL power control, where the UE has multiple transmit antennas. Operations 800 may occur while the UE is in a normal operating mode and is being served by an eNB, such as eNB 105.

Operations 800 may begin with the UE determining a transmit power level for different channels in its UL (block 805). The UE may separately determine a transmit power level for each channel that it transmits, such as for the PUSCH and the PUCCH, and independently sets the transmit power level for each channel. However, since the UE has multiple transmit antennas (with a separate PA for each transmit antenna), the UE may need to consider the transmit power for each transmit antenna.

According to an example embodiment, the UE may make use of sum power control to perform power control for the UL, i.e., determines transmit power level for channel on all transmit antennas (block 805). Furthermore, the sum power control may be performed for individual component carriers, c. For the PUSCH, the power control formula for UL power control by the UE may be expressed as $$P_{PUSCH}(i,c) = \min\{P_{CMAX}(c), 10\log_{10}(M_{PUSCH}(i,c)) + P_{O\_PUSCH}(j,c) + \alpha(j,c) \cdot PL(c) + \Delta_{TF}(i,c) + f(i,c)\},$$

where
- $P_{CMAX}(c)$ is the configured UE transmitted power for component carrier c;
- $M_{PUSCH}(i,c)$ is the bandwidth of the PUSCH resource assignment expressed in number of resource blocks valid for subframe i and component carrier c;
- $P_{O\_PUSCH}(j,c)$ is a parameter configured by the eNB for component carrier c;
- $\alpha \in \{0, 0.4, 0.5, 0.6, 0.7, 0.8, 0.9, 1\}$ is a cell specific parameter provided by higher layers;
- PL(c) is a reference path loss derived from the RSRP and/or path loss of each involved transmit antennas at the UE by, for example, averaging or other manipulations;
- $\Delta_{TF}(i,c) = 10\log_{10}((2^{MPR \cdot K_S} - 1)\beta_{offset}^{PUSCH})$ for $K_S = 1.25$ is the power offset for component carrier c based on the transmission format and it can be turn off (equal to 0) for $K_S = 0$; and
- The current PUSCH power control adjustment state for component carrier c is given by f(i,c).

Also, $P_{PUSCH}(i, c)$ is shared by all the involved antennas with the transmit power of antenna a as $$P_{PUSCH}(i, c, a) = P_{PUSCH}(i, c) + \Delta_{Ant}(i, c, a),$$

where $$\Delta_{Ant}(i, c, a) = 10\log_{10}\left(\frac{1}{N_{Ant}(c)}\right) + \Delta_{CW}(i, a),$$

$N_{Ant}(c)$ is a number of antennas involved for SU-MIMO transmission for component carrier c, and $\Delta_{CW}(i,a)$ is the additional offset for the codeword involving antenna a. $\Delta_{CW}(i,a)$ may be signaled semi-statically by RRC signaling or dynamically by the PDCCH. The sum of $\Delta_{Ant}(i,c,a)$ in a linear scale over the involved antennas should be equal to one.

Furthermore, f(i,c) may be reset to zero when the transmission mode of PUSCH for component carrier c changes.

In addition to computing a transmit power level for different channels in its UL for each of the multiple transmit antenna, the UE may also optionally utilize the TF used in the UL transmission of a channel in computing the transmit power (block 810). According to an example embodiment, for SU-MIMO mode, let $\Delta_{TF}(i,c) = 0$, at least for the transmission mode where rank larger than one is allowed.

According to an example embodiment, power control is performed separately for each component carrier in the case of carrier aggregation where the UE may simultaneously transmit and/or receive signals on multiple component carriers. Each component carrier may be uniquely identified by associated information, such as a cell identifier (cell ID) and frequency. A component carrier may sometimes be called a cell. The multi-antenna power control methods then apply to each of the component carriers or cells.

After computing the transmit power level for the different channels in the UL for the multiple transmit antennas (and optionally providing adjustment based on TF), the UE may set the transmit power level for a channel that it is preparing to transmit by setting the PA of each transmit antenna to a determined transmit power level that corresponds to the channel and/or transmit antenna that it is preparing to transmit (block 815) and then transmit the channel over the multiple transmit antenna (block 820).

Figure 9:
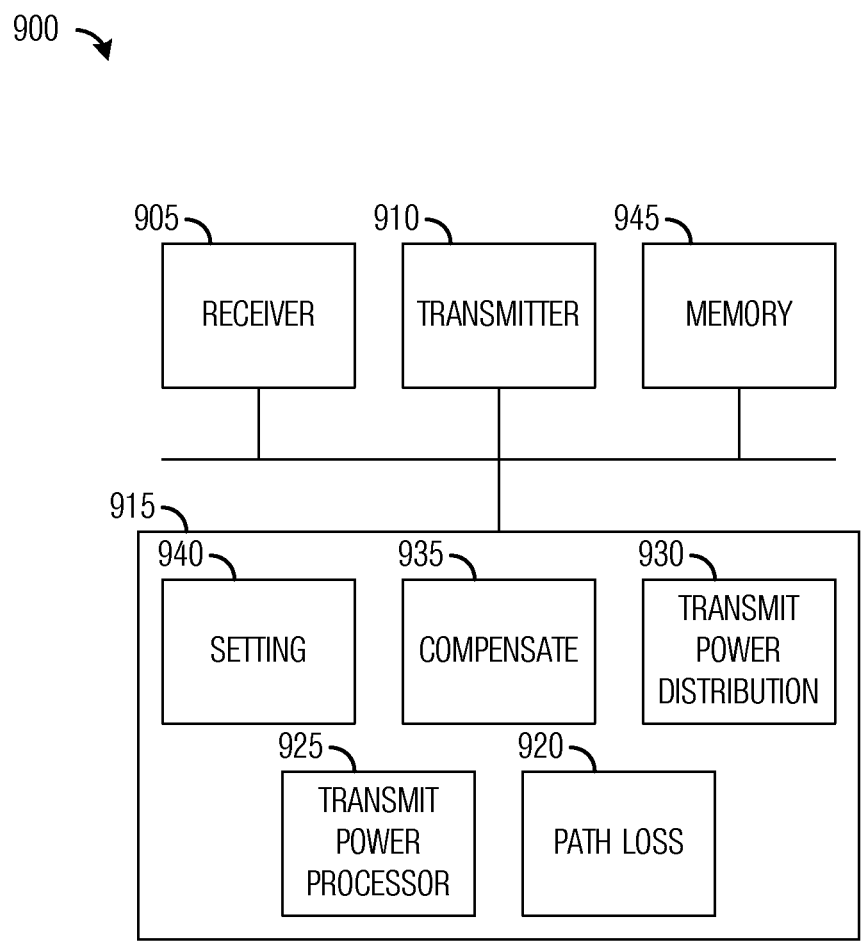
FIG. 9 provides an example of an alternate illustration of a communications device according to example embodiments described herein.

FIG. 9 provides an alternate illustration of a communications device 900. Communications device 900 may be an implementation of a UE. Communications device 900 may be used to implement any one or all of the embodiments discussed herein. As shown in FIG. 9, a receiver 905 is configured to receive information and a transmitter 910 is configured to transmit information. A path loss unit 920 is configured to compute path loss between an eNB serving communications device 900 and transmit antenna(s) of communications device 900. Depending upon a power control technique being utilized in communications device 900, path loss unit 920 may compute a single reference path loss, multiple reference path losses, multiple path losses between it's transmit antennas and the eNB.

A transmit power processor 925 is configured to determine a transmit power level for the transmit antenna(s) of communications device 900. As discussed previously, transmit power processor 925 may make use of several different techniques for determining the transmit power level of communications device 900, including per antenna power control, per layer and/or per codeword power control, sum power control, or combinations thereof, techniques. Depending on the power control technique used, transmit power processor 925 may make use of information such as path loss computed by path loss unit 920, as well as information provided by the eNB serving communications device 900, for example.

A transmit power distribution unit 930 electrically connected to the transmit power processor 925 is configured to distribute to each of the respective antennas the transmit power level determined by transmit power processor 925. For example, if a sum power control technique is used, then transmit power distribute unit 930 may distribute the transmit power level across the transmit antenna(s) of communications device 900. Transmit power distribute unit 930 may distribute the transmit power level equally, substantially equally, based on a specified distribution, based on a criteria, or so forth, over the transmit antenna(s).

A compensate unit 935 is configured to provide compensation for the transmit power level of communications device 900 based on a transmission format used by communications device 900 in its transmissions. Compensation based on transmission format may be optional. A setting unit 940 is configured to set power amplifier(s) of the transmit antenna(s) based on the transmit power level. A memory 945 is configured to store information, such as path loss, information from the eNB, computed transmit power level, distribution distributions and/or criteria, and so on.

The elements of communications device 900 may be implemented as specific hardware logic blocks. In an alternative, the elements of communications device 900 may be implemented as software executing in a processor, controller, application specific integrated circuit, or so on. In yet another alternative, the elements of communications device 900 may be implemented as a combination of software and/or hardware.

As an example, receiver 905 and transmitter 910 may be implemented as a specific hardware block, while path loss unit 920, transmit power computer 925, transmit power distribute unit 930, compensate unit 935, and a setting unit 940 may be software modules executing in a microprocessor (such as processor 915) or a custom circuit or a custom compiled logic array of a field programmable logic array or combinations thereof.

The above described embodiments of UE 300 and communications device 900 may also be illustrated in terms of methods comprising functional steps and/or non-functional acts. The previous description and related flow diagrams illustrate steps and/or acts that may be performed in practicing example embodiments of the present invention. Usually, functional steps describe the invention in terms of results that are accomplished, whereas non-functional acts describe more specific actions for achieving a particular result. Although the functional steps and/or non-functional acts may be described or claimed in a particular order, the present invention is not necessarily limited to any particular ordering or combination of steps and/or acts. Further, the use (or non use) of steps and/or acts in the recitation of the claims—and in the description of the flow diagrams(s) for FIGS. 4*a*, 4*b*, 4*c*, 4*d*, 4*e*, 4*f*, 5*a*, 5*b*, 5*c*, 6*a*, 6*b*, 6*c*, 7*a*, 7*b*, and 8—is used to indicate the desired specific use (or non-use) of such terms.

Although the present invention and its advantages have been described in detail, it should be understood that various changes, substitutions and alterations can be made herein without departing from the spirit and scope of the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for user equipment operations, the method comprising:
   determining, at a user equipment having at least two transmit antennas, a transmit power level for the at least two transmit antennas on a per transmission layer or a per transmission codeword basis as the sum of transmit powers for the at least two transmit antennas;
   scaling the sum of transmit powers by a ratio of a number of antennas with a non-zero physical uplink shared channel (PUSCH) transmission to the number of available transmit antennas;
   distributing the scaled sum of transmit powers substantially equally across transmission layers or transmission codewords; and
   setting a power amplifier output level independently for each of the at least two transmit antennas in accordance with a respective transmit power level,
   wherein determining a transmit power level for transmit antennas comprises determining the transmit power level for transmit antennas in accordance with a transmission format of transmissions made over the at least two transmit antennas.

2. The method of claim 1, wherein the transmit power level is determined for each channel transmitted on each of the at least two transmit antennas.

3. The method of claim 1, wherein determining the transmit power level on a per transmission layer or a per transmission codeword basis comprises separately determining the transmit power level for each transmission layer or each transmission codeword.

4. The method of claim 1, wherein distributing the scaled sum of transmit powers comprises distributing the scaled sum of transmit powers based on a predetermined distribution.

5. The method of claim 1, wherein distributing the scaled sum of transmit powers comprises distributing the scaled sum of transmit powers based on a criterion.

6. The method of claim 5, wherein the criterion comprises any one, or combination, of the following: transmit antenna path loss, distance to a destination device, channel quality, channel information, channel error rate, communications device priority, and quality of service requirements.

7. The method of claim 1, wherein determining the transmit power level in accordance with the transmission format comprises adjusting the transmit power using an offset that is used only for single input, multiple output transmission mode.

8. The method of claim 1, wherein the information is transmitted over a plurality of codewords, and wherein determining the transmit power level in accordance with the transmission format comprises adjusting the transmit power using an offset for one of the codewords that is determined according to transmission formats of a subset of the codewords.

9. The method of claim 8, wherein a formula and/or parameters used in determining the offset is configured by a communications controller serving the user equipment.

10. The method of claim 9, wherein the communications controller configures the formula and/or the parameters by selecting a value of $K_S$ from a set of multiple non-zero values.

11. A method for user equipment operations, the method comprising:
   determining, at a user equipment, a transmit power level for each of at least two transmit antennas of the user equipment, wherein the determining is in accordance with a sum of transmit powers for the at least two transmit antennas;
   scaling the sum of transmit powers by a ratio of a number of antennas with a non-zero physical uplink shared channel (PUSCH) transmission to the number of available transmit antennas;
   distributing the scaled sum of transmit powers substantially equally across transmission layers or transmission codewords; and
   setting a power amplifier output level independently for each of the at least two transmit antennas in accordance with a respective transmit power level,
   wherein determining a transmit power level for transmit antennas comprises determining the transmit power level for transmit antennas in accordance with a transmission format of transmissions made over the at least two transmit antennas.

12. The method of claim 11, wherein distributing the scaled sum of transmit powers across the transmission layers or the transmission codewords is based on a distribution received from a communications controller serving the user equipment.

13. The method of claim 12, wherein the transmit power level is determined for a shared data channel, and wherein determining the sum of transmit powers comprises evaluating $$P_{PUSCH}(i,c)=\min\{P_{CMAX}(c), 10\log_{10}(M_{PUSCH}(i,c))+P_{O\_PUSCH}(j,c)+\alpha(j,c)\cdot PL(c)+\Delta_{TF}(i,c)+f(i,c)\},$$

where $P_{PUSCH}$(i,c) is the transmit power level for shared data channel at subframe i and component carrier c, $P_{CMAX}$(c) is a configured user equipment transmitted power for component carrier c, $M_{PUSCH}$(i,c) is a bandwidth of a resource assignment for the shared data channel expressed in number of resource blocks valid for subframe i and component carrier c, $P_{O\_PUSCH}$(j,c) is a parameter configured by a destination device for component carrier c, $\alpha\epsilon\{0, 0.4, 0.5, 0.6, 0.7, 0.8, 0.9, 1\}$ is a cell specific parameter provided by higher layers, PL(c) is a reference path loss, $\Delta_{TF}$ (i,c)=$10\log_{10}((2^{MPR\cdot K_s}-1)\beta_{offset}^{PUSCH}$ for $K_S>0$ is a power offset for component carrier c based on a transmission format, and f(i,c) is a current shared data channel power control adjustment state for component carrier c, wherein i and c are integers.

14. A user equipment comprising:
a transmit power processor configured to determine a transmit power level independently for transmit antennas of the user equipment, wherein the user equipment comprises at least two transmit antennas, on a per transmission layer or a per transmission codeword basis in accordance with a scaled sum of transmit powers for the at least two transmit antennas wherein the scaled sum of transmit powers comprises the sum of transmit powers scaled by a ratio of the number of transmit antennas with a non-zero physical uplink shared channel (PUSCH) transmission to the number of available transmit antennas, wherein the scaled sum of transmit powers is distributed substantially equally across transmission layers or transmission codewords, wherein determining a transmit power level for transmit antennas comprises determining the transmit power level for transmit antennas in accordance with a transmission format of transmissions made over the at least two transmit antennas; and
a power setting unit coupled to the transmit power processor, the power setting unit configured to set a power amplifier output level for each of the transmit antennas in accordance with a respective transmit power level.

15. The user equipment of claim 14, further comprising a path loss unit coupled to a receiver, and operable to determine a path loss between a transmit antenna and a destination device.

16. The user equipment of claim 14, wherein the transmit power processor determines the transmit power level for each transmit antenna of the user equipment.

17. The user equipment of claim 14, further comprising a transmit power distribution unit coupled to the transmit power processor, the transmit power distribution unit configured to distribute the scaled sum of transmit powers over the transmit antennas.

18. The user equipment of claim 14, further comprising a compensate unit coupled to the transmit power processor, the compensate unit configured to compensate the transmit power level based on a transmission format of transmissions made over the transmit antennas.

19. A method for user equipment operations, the method comprising:
determining, at a user equipment having at least two transmit antennas, a transmit power level independently for the at least two transmit antennas on a per transmission layer or a per transmission codeword basis as the sum of transmit powers for the at least two transmit antennas, wherein determining the transmit power level for each of the transmit antennas comprises determining the transmit power level for the transmit antennas in accordance with a transmission format of transmissions made over the at least two antennas and adjusting the transmit power using an offset;
scaling the sum of transmit powers by a ratio of a number of antennas with a non-zero physical uplink shared channel (PUSCH) transmission to the number of available transmit antennas;
distributing the scaled sum of transmit powers substantially equally across transmission layers or transmission codewords; and
setting a power amplifier output level for each of the at least two transmit antennas in accordance with a respective transmit power level,
wherein determining a transmit power level for transmit antennas comprises determining the transmit power level for transmit antennas in accordance with a transmission format of transmissions made over the at least two transmit antennas.

20. The method of claim 19, wherein adjusting the transmit power using an offset is used only for single input, multiple output transmission mode.

* * * * *